(12) United States Patent
Day et al.

(10) Patent No.: US 9,513,643 B2
(45) Date of Patent: Dec. 6, 2016

(54) BUILDING DEVICE CLUSTER DATA DISPLAY WITH THUMBNAIL GRAPHICAL DISPLAY INTERFACE

(71) Applicant: Emerson Climate Technologies Retail Solutions, Inc., Kennesaw, GA (US)

(72) Inventors: Donald Day, Kennesaw, GA (US); Paul Thompson, Worthing (GB); Timothy Coyle, Alpharetta, GA (US); John Wallace, Acworth, GA (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 569 days.

(21) Appl. No.: 13/867,719

(22) Filed: Apr. 22, 2013

(65) Prior Publication Data

US 2013/0289774 A1 Oct. 31, 2013

Related U.S. Application Data

(60) Provisional application No. 61/637,033, filed on Apr. 23, 2012.

(51) Int. Cl.
  *G05D 23/19* (2006.01)
  *G05B 15/02* (2006.01)
(52) U.S. Cl.
  CPC ........... *G05D 23/1919* (2013.01); *G05B 15/02* (2013.01); *G05B 2219/2642* (2013.01)
(58) Field of Classification Search
  None
  See application file for complete search history.

(56) References Cited

U.S. PATENT DOCUMENTS

| 2007/0278320 | A1* | 12/2007 | Lunacek | G05D 23/1902 236/94 |
| 2009/0057425 | A1* | 3/2009 | Sullivan | F24F 11/0009 236/51 |

(Continued)

FOREIGN PATENT DOCUMENTS

| JP | 2005073415 A | 3/2005 |
| KR | 20040079583 A | 9/2004 |

(Continued)

OTHER PUBLICATIONS

International Search Report regarding Application No. PCT/US2013/037719, mailed Jul. 25, 2013.

(Continued)

*Primary Examiner* — Mohammad Ali
*Assistant Examiner* — Bernard G Lindsay
(74) *Attorney, Agent, or Firm* — Harness, Dickey & Pierce, P.L.C.

(57) ABSTRACT

A system and method for display of multiple data sets related to building systems is provided. A first building system includes a first sensor that generates first operating data corresponding to the first building system. A second building system includes a second sensor that generates second operating data corresponding to the second building system. A data server stores the first operating data and the second operating data. A user terminal accesses the first operating data and the second operating data, receives user input selecting the first operating data and the second operating data for display, and displays the first operating data and the second operating data together in a graphical display.

15 Claims, 6 Drawing Sheets

(56) References Cited

U.S. PATENT DOCUMENTS

| | | | | |
|---|---|---|---|---|
| 2010/0162110 A1* | 6/2010 | Williamson | ............ | G05B 15/02 |
| | | | | 715/702 |
| 2011/0093424 A1 | 4/2011 | Zimmermann et al. | | |
| 2012/0060529 A1* | 3/2012 | Singh | ........................ | A23G 9/00 |
| | | | | 62/129 |
| 2013/0282624 A1* | 10/2013 | Schackmuth | ........ | G08B 21/182 |
| | | | | 705/412 |

FOREIGN PATENT DOCUMENTS

| | | |
|---|---|---|
| KR | 20050060792 A | 6/2005 |
| KR | 20100125809 A | 12/2010 |
| WO | WO-2006091521 A2 | 8/2006 |

OTHER PUBLICATIONS

Written Opinion of the International Searching Authority regarding Application No. PCT/US2013/037719, mailed Jul. 25, 2013.
Office Action regarding Australian Patent Application No. 2013252537, dated Aug. 20, 2015.
Office Action regarding Canadian Patent Application No. 2,871,443, dated Feb. 19, 2016.
Search Report regarding European Patent Application No. 13781609.6, dated Jun. 1, 2016.

* cited by examiner

BUILDING DEVICE CLUSTER DATA DISPLAY WITH THUMBNAIL GRAPHICAL DISPLAY INTERFACE

CROSS-REFERENCE TO RELATED APPLICATION

This application claims the benefit of U.S. Provisional Application No. 61/637,033, filed on Apr. 23, 2012. The entire disclosure of the above application is incorporated herein by reference.

FIELD

The present disclosure relates to a system and method for displaying data for device clusters and, more specifically, to a system and method for concurrent display of multiple data sets related to refrigeration, HVAC, and other building systems.

BACKGROUND

This section provides background information related to the present disclosure which is not necessarily prior art.

Retail outlets, particularly food retailers, require multiple building systems during operation. Such building systems often include refrigeration, HVAC, lighting, and alarm systems, for example. Each of these building systems includes associated equipment to perform various functions and associated sensors to monitor related operating data for the associated equipment. Such monitored data, for example, may include various temperatures and pressures of the equipment, the system, or environment, as well as electrical data, such as current and energy consumption data for the equipment or system.

Retailers may monitor the building systems for unexpected operation by monitoring the sensed data. It is difficult, however, to monitor and compare different data sets from different sensors, devices, controllers, or equipment. For example, a user may have to examine data for each device separately, relying on memory to accomplish necessary comparisons. This, however, places a burden on the user as the user must switch from one device or display to another, losing the context of the relationships they may be trying to judge or compare.

SUMMARY

This section provides a general summary of the disclosure, and is not a comprehensive disclosure of its full scope or all of its features.

A system is provided and includes a first building system including a first sensor that generates first operating data corresponding to the first building system and a second building system including a second sensor that generates second operating data corresponding to the second building system. The system also includes a data server that stores the first operating data and the second operating data. The system also includes a user terminal that accesses the first operating data and the second operating data, that receives user input selecting the first operating data and the second operating data for display, and that displays the first operating data and the second operating data together in a graphical display.

A computer readable storage medium is provided that stores instructions executable by a processor for receiving a plurality of datasets, each dataset including operating data corresponding to at least one building system that is generated by at least one of a sensor and a controller of the corresponding building system. The computer readable storage medium includes at least one preprogrammed selection option that includes a predetermined group of datasets from the plurality of datasets. The instructions include receiving a user input selection indicating a selected group of datasets for display in a graphical display, the selected group of datasets including at least one of the predetermined group of datasets of the preprogrammed selection option and a user-selected group of datasets from the plurality of datasets. The instructions include displaying the operating data for each of the selected group of datasets in a graphical display, including displaying the operating data for the predetermined group of datasets when the at least one preprogrammed selection option is selected.

Another computer readable storage medium is provided that stores instructions executable by a processor for receiving a plurality of datasets, each dataset including operating data corresponding to at least one building system that is generated by at least one of a sensor and a controller of the corresponding building system. The instructions include analyzing the plurality of datasets with the processor and determining at least one data pattern from the plurality of datasets. The instructions include determining a suggested dataset selection option based on the at least one data pattern from the plurality of datasets, the suggested dataset selection option including a preset group of datasets, each dataset of the preset group of datasets including data related to the determined at least one data pattern. The instructions include receiving a user input selection indicating a selected group of datasets for display in a graphical display, the selected group of datasets including at least one of the preset group of datasets of the suggested dataset selection option and a user-selected group of datasets from the plurality of datasets. The instructions include displaying the operating data for each of the selected group of datasets in a graphical display, including displaying the operating data for the preset group of datasets when the suggested dataset selection option is selected.

Another computer readable storage medium is provided that stores instructions executable by a processor for receiving a plurality of datasets, each dataset including operating data corresponding to at least one building system that is generated by at least one of a sensor and a controller of the corresponding building system. The instructions include receiving a user input selection indicating at least one of an event and a fault condition of the at least one building system. The instructions include determining a related dataset selection option based on at least one of the event and the fault condition, the related data set selection option including a related group of datasets, each dataset of the related group of datasets including data related to at least one of the event and the fault condition. The instructions include receiving a user input selection indicating a selected group of datasets for display in a graphical display, the selected group of datasets including at least one of the related group of datasets of the related dataset selection option and a user-selected group of datasets from the plurality of datasets. The instructions include displaying the operating data for each of the selected group of datasets in a graphical display, including displaying the operating data for the related group of datasets when the related dataset selection option is selected.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION

Example embodiments will now be described more fully with reference to the accompanying drawings.

Figure 1:
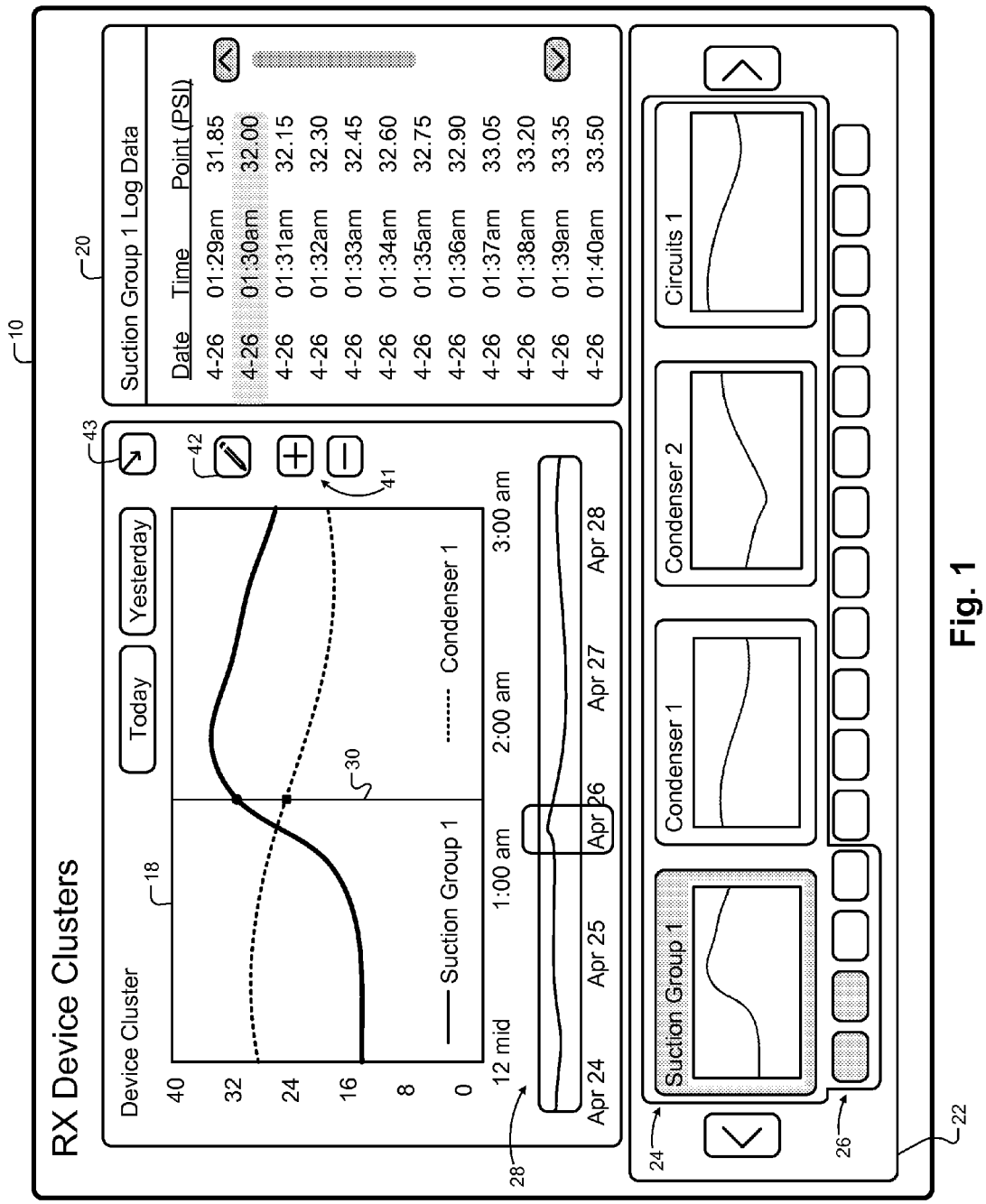
FIG. 1 illustrates a screenshot of a data display in accordance with the present disclosure.

With reference to FIG. 1, a screenshot of a data display window 10 showing data for selected device clusters is shown. The data display window 10 includes a main graph window 18, a log data window 20, and a carousel selection window 22.

The carousel selection window 22 includes large thumbnail images 24 and small thumbnail images 26 corresponding to the different data sets that can be displayed. For example, in FIG. 1, four large thumbnail images 24 are shown corresponding to Suction Group 1, Condenser 1, Condenser 2, and Circuits 1. Any number of large thumbnail images 24 can be shown.

Each of the data sets corresponds to a particular set of data values associated with a particular building system or building system component. For example, a data set may be generated by a particular sensor of a refrigeration system, an HVAC system, a lighting system, an alarm system, or other building system. For further example, a data set may be a suction group data set and may include suction pressure data recorded over time for a group of compressors (i.e., a suction group) in a compressor rack of a refrigeration or HVAC system, as sensed by an associated suction pressure sensor. Likewise, the data set may include discharge data generated by a discharge pressure sensor of a group of compressors in a compressor rack. Further, the data set may include suction temperature data or discharge temperature data of a compressor group. Further the data set may be associated with a condenser of a refrigeration or HVAC system and may include discharge pressure or discharge temperature data from the condenser as sensed by an associated pressure or temperature sensor. Additionally, the data set may include temperature data for a refrigeration case of a refrigeration system. Likewise, the data set may include indoor temperature or humidity data of an interior space to be heated or cooled by an HVAC system as sensed by corresponding temperature or humidity sensors. Further, the data set may include ambient outdoor temperature as sensed by an ambient temperature sensor. Further, the data set may include occupancy data as sensed by an occupancy sensor. Further, the data set may include alarms, such as motion sensor alarms. Further, the data set may include historical logs of set-point change events for any device, controller, or equipment that operates with a set-point, for example a temperature or pressure set-point. Any other data sensed, determined, or calculated by a building system sensor or controller over time can also be used.

In FIG. 1, sixteen small thumbnail images 26 are shown below the large thumbnail images 24. In this way, the carousel selection window 22 includes a total of sixteen data sets that can be selected for display. While sixteen data sets are shown in FIG. 1, any number of data sets can be used. As individual data sets are selected from the carousel selection window 22, the corresponding data associated with the data set is displayed in the main graph window 18. For example, in FIG. 1 the data sets for Suction Group 1 and for Condenser 1 have been selected in the carousel selection window 22 and the corresponding data sets are displayed in the main graph window 18. As shown in FIG. 1, the small thumbnail images 26 for selected data sets are highlighted (as shown by gray shading of the corresponding small thumbnail images).

In the main graph window 18, as shown in the example of FIG. 1, time values are represented along the bottom horizontal axis of the main graph window 18 and pressure (PSI) values are represented along the vertical axis of the main graph window 18. In FIG. 1, data is shown for Suction Group 1 and Condenser 1. The Suction Group 1 data set corresponds to suction pressure data for a suction group, i.e., a compressor group, of a refrigeration or HVAC system. The Condenser 1 data set corresponds to condenser discharge pressure data for a condenser of a refrigeration or HVAC system.

The main graph window 18 includes a time scale slider 28. As the time scale slider 28 is dragged to the left and to the right, the data values within the time period corresponding to the position of the time scale slider 28 are displayed in the main graph window 18. For example, in FIG. 1 the time scale slider is positioned on April $26^{th}$ between the hours of midnight and 3:00 a.m., and the corresponding data values for Suction Group 1 and Condenser 1 are displayed in the main graph window 18.

Additionally, as the time scale slider 28 is dragged to the left and to the right, the large thumbnail images 24 are dynamically updated as well to show the data values within the time period corresponding to the position of the time scale slider 28. For example, in FIG. 1 the data values for Suction Group 1, Condenser 1, Condenser 2, and Circuits 1, between the hours of midnight and 3:00 a.m. on April $26^{th}$, are shown in the corresponding large thumbnail images 24 of the carousel selection window 22. In this way, a user can, at a glance, scan the graphs corresponding to the data sets in the large thumbnail images 24 and determine which data sets to select for display in the main graph window 18.

While multiple data sets can be selected for display in the main graph window 18, one of the data sets can be selected for designation as the "focus" data set. When a large thumbnail image 24 is selected, for example by "clicking" or "touching" the particular large thumbnail image 24, in the carousel selection window 22, the corresponding data set can be displayed in the main graph window 18. When the same large thumbnail image 24 is selected, by clicking or touching, a second time, the corresponding data set can be designated as the focus data set. For example, in FIG. 1, the Suction Group 1 data set is designated as the focus data set. To indicate the focus data set designation, the corresponding large thumbnail image 24 for the Suction Group 1 data can be highlighted in the carousel selection window 22, as shown by gray shading of the Suction Group 1 large thumbnail image.

Additionally, when a particular data set is designated as the focus data set, its graph line in the main graph window 18 can be displayed in a manner to set it apart from the other graph lines displayed in the main graph window 18. For example, in FIG. 1, the graph line for Suction Group 1 is shown as a solid line while the graph line for Condenser 1 is shown as a dashed line. Alternatively a designated color may be used for the graph line of the focus data set. Additionally, when a particular data set is designated as the focus data set, its graph line is shown as the graph line in the window of the time scale slider 28. In this way, actual data from the particular data set designated as the focus data set is used in the main graph window 18, in the window of the time scale slider, and in the large thumbnail image 24 of the carousel selection window 22.

Additionally, when a data set is selected as the focus data set, corresponding log data is displayed in the log data window 20. In FIG. 1, for example, Suction Group 1 is selected as the focus data set and log data for Suction Group 1, within the time period designated by the time scale slider 28, is displayed in the log data window. In FIG. 1, log data is displayed in the log data window 20 in one-minute increments.

Further, a particular data value in a particular row of the log data displayed in the log data window 20 can be selected. In FIG. 1, the log data in the second row of the log data window 20 is selected and highlighted as shown by the gray shading. In particular, the data value of 32.00 PSI, recorded at 01:30 am in the Suction Group 1 data set is selected. When a particular data value in the log data window 20 is selected, the corresponding value is shown in the main graph window 18. In FIG. 1, a vertical line 30 is shown in the main graph window 18 corresponding to the 1:30 am time on the horizontal axis. Further, the intersection of the vertical line 30 with the Suction Group 1 graph line at 32.00 PSI is designated with a black circular dot. Further, the intersection of the vertical line 30 with the Condenser 1 graph line is designated with a square black dot, for purposes of comparison.

Additional data in the log data window 20 can be viewed by using the scroll bar and up-down arrows for the scroll bar.

When the time scale slider 28 is dragged to the left and to the right, the log data in the log data window 20 is appropriately updated to display the corresponding data of the data set associated with the time period designated by the time scale slider 28. In this way, as the time scale slider 28 is dragged to the left and to the right, the graph displayed in the main graph window 18, the data displayed in the log data window 20, and the graphs displayed in the large thumbnail images 24 of the carousel selection window 22 are each updated to correspond to the time period indicated by the time scale slider 28.

As data sets with different units are displayed in the main graph window 18, the vertical axis of the main graph window 18 can be appropriately updated to reflect the correct data units. For example, in FIG. 1 both the Suction Group 1 and the Condenser 1 data sets include data recorded in pressure (PSI) data units. However, if the Circuits 1 data set is selected, the main graph window can be updated to reflect units of temperature on the vertical axis. Additionally, if data sets with different data units are selected for display in the main graph window 18, different units can be displayed on the left-hand vertical axis and on the right-hand vertical axis. Specifically, with reference to FIG. 2, data sets for Suction Group 1 and Circuits 1 are selected for display in the main graph window 18. Further, units of pressure (PSI) are used on the left-hand vertical axis 45 and units of temperature are used on the right-hand vertical axis 46 of the main graph window 18.

Figure 2:
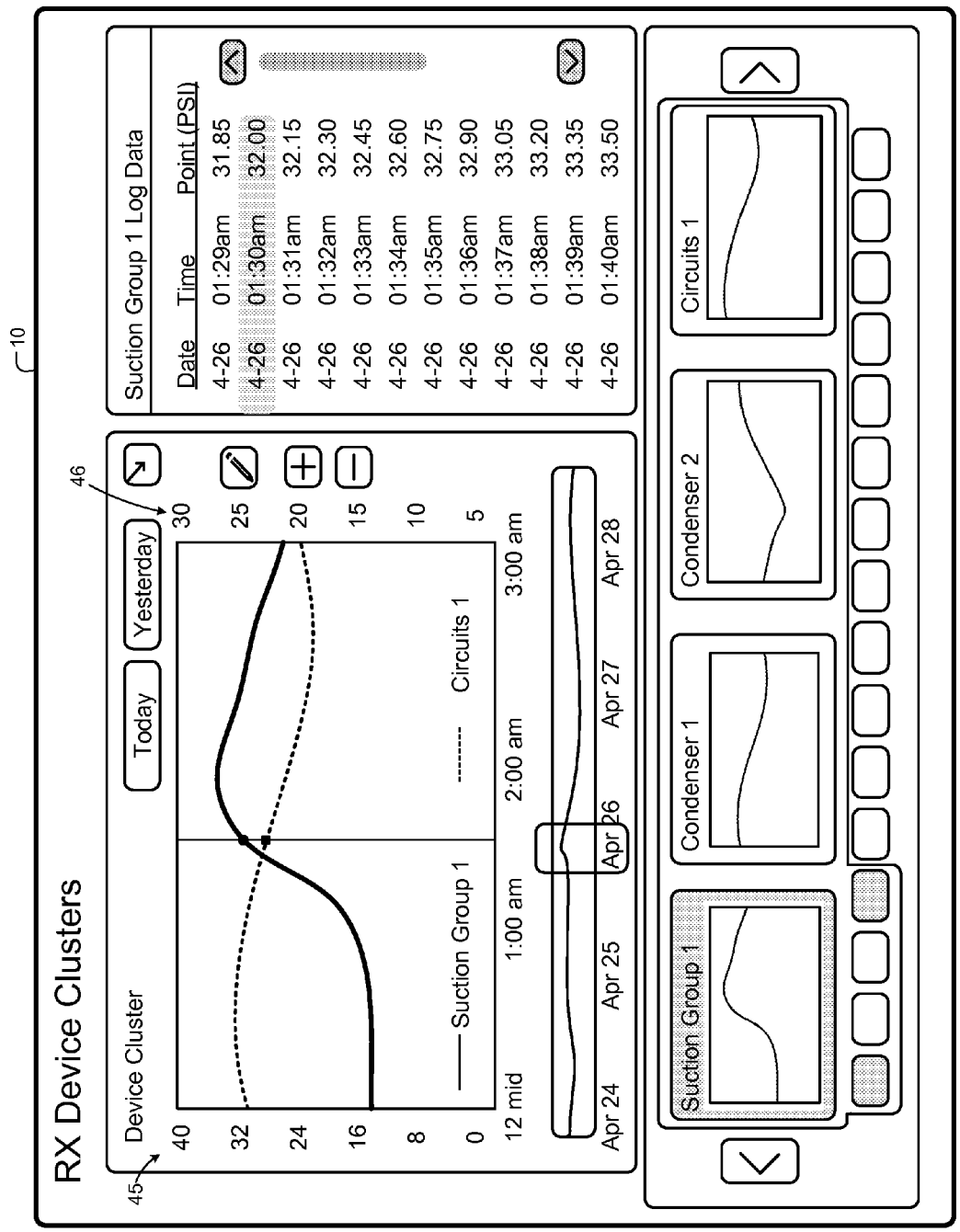
FIG. 2 illustrates a screenshot of a data display in accordance with the present disclosure.
Figure 3:
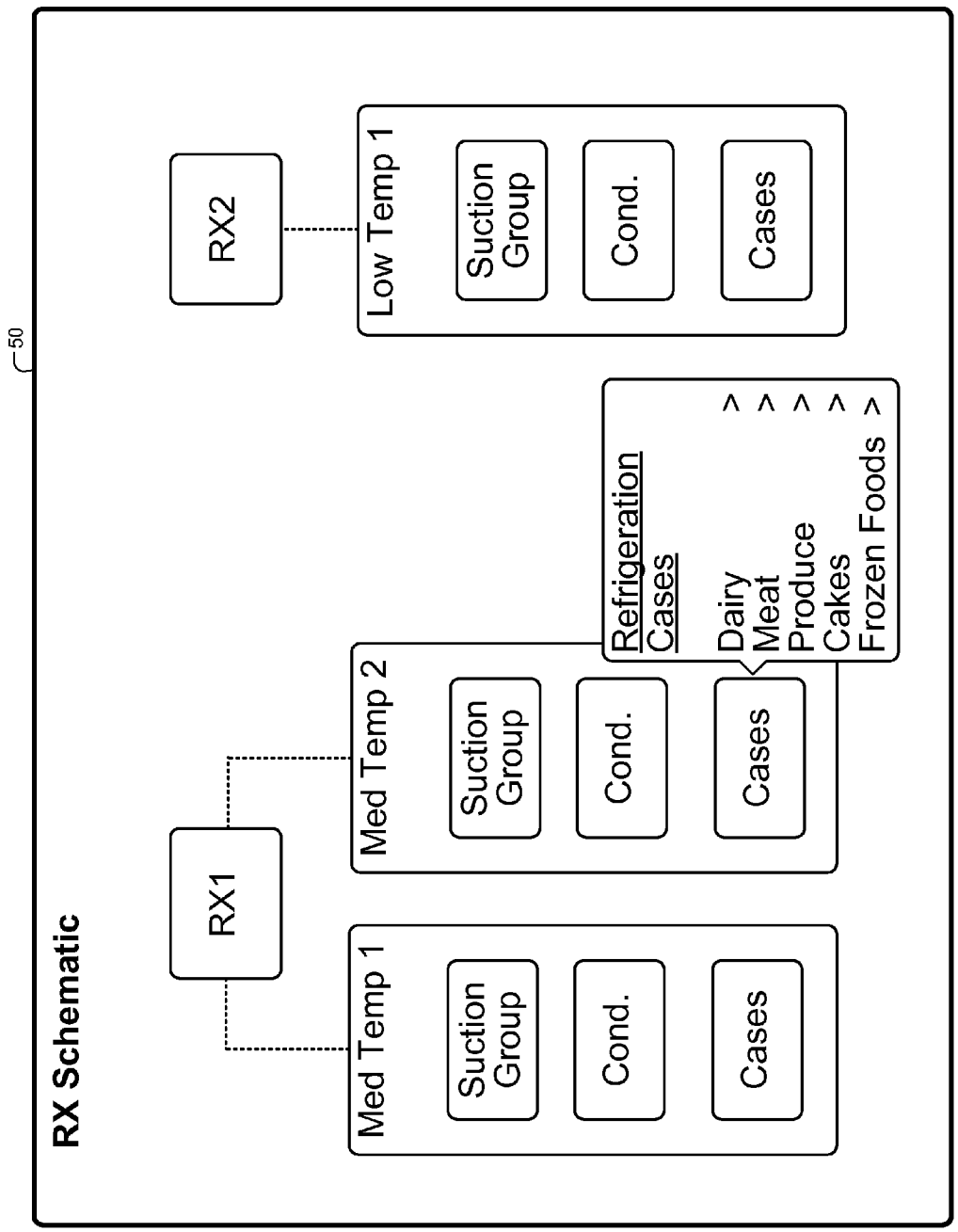
FIG. 3 illustrates a screenshot of a data display in accordance with the present disclosure.

With reference to FIG. 3, a screenshot of a schematic display window 50 showing a view of devices associated with a particular group of building systems is shown. In FIG. 3, two refrigeration controllers are designated as RX1 and RX2. Further, the RX1 controller is connected to two refrigeration circuits designated as Med Temp 1 and Med Temp 2. These correspond to two different medium temperature refrigeration circuits. Each of the medium temperature refrigeration circuits has a suction group, a condenser group, and a cases group. Further, the RX2 controller is connected to a low temperature refrigeration circuit designated as Low Temp 1. The low temperature refrigeration circuit also has a suction group, a condenser group, and a cases group. By clicking on any of the individual devices or groups—e.g., a suction group, a condenser group, or a cases group—a user can view the particular data sets associated with and available for that device or group. For example, by clicking on the cases group of the circuit designated Med Temp 2, the individual cases associated with that refrigeration circuit are displayed as: Dairy, Meat, Produce, Cakes, and Frozen Foods. Any of those particular cases can have an associated data set of temperature/time data. A user can click on the particular data set, for example, the Dairy refrigeration case, and have the corresponding data set populated into the main graph window 18 of the data display window 10 and/or into a large thumbnail image 24 of the carousel selection window 22 shown in FIGS. 1 and 2. In this way, the schematic display window 50 presents the user with a systems/equipment/device view of the building systems and allows the user to select different data sets from across the various systems, equipment, and devices for comparison and display in the data display window 10.

Figure 4:
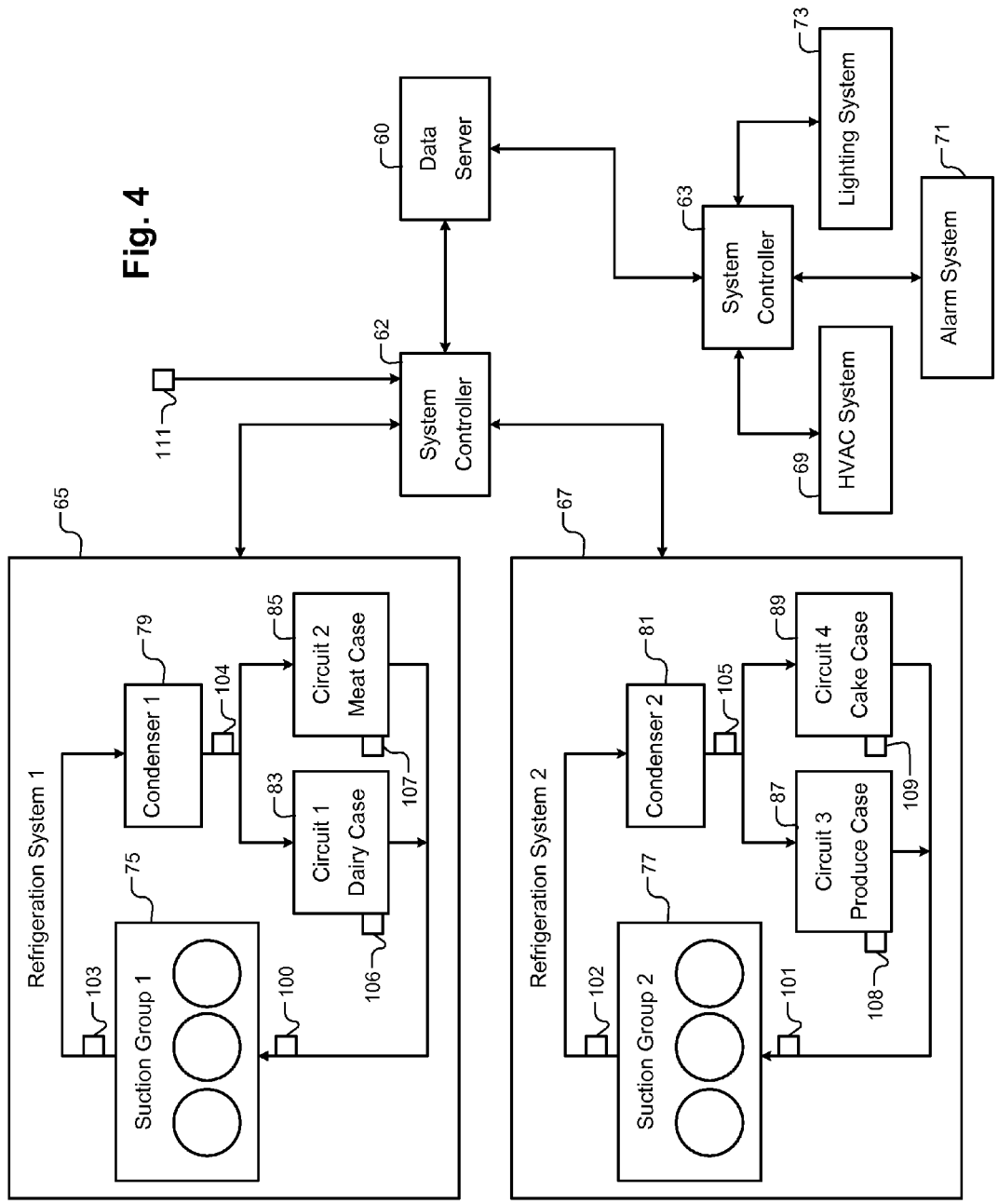
FIG. 4 is a block diagram of multiple building systems in accordance with the present disclosure.

With reference to FIG. 4, a data server 60 is shown connected to system controllers 62, 63. The data server 60 receives and stores data sets associated with the various building systems connected to the system controllers 62, 63. For example, system controller 62 is connected to and controls two refrigeration systems 65, 67. System controller 63 is connected to and controls an HVAC system 69, an alarm system 71, and a lighting system 73. Each of the building systems include various operating parameter sensors which generate operating data that is communicated to the system controllers 62, 63 and, subsequently, to the data server 60.

Each of the refrigeration systems 65, 67 include a suction group 75, 77, and a condenser 79, 81. Further, each of the refrigeration systems 65, 67 include particular circuits or cases. For example, refrigeration system 65 includes a dairy case 83 and a meat case 85. Refrigeration system 67 includes a produce case 87 and a cake case 89.

Each of the refrigeration systems 65, 67 also includes various operating parameter sensors for sensing the various operating parameters. For example, each of the refrigeration systems 65, 67 includes a suction pressure sensor 100, 101, a discharge pressure sensor 102, 103, and a condenser discharge temperature sensor 104, 105. Further, each of the cases 83, 85, 87, 89 includes an associated case temperature sensor 106, 107, 108, 109.

System controller 62 is also connected to an ambient temperature sensor 111.

All of the building systems, system controllers 62, 63, and the data server 60 can be located at a local site, such as a retail store or other facility.

Figure 5:
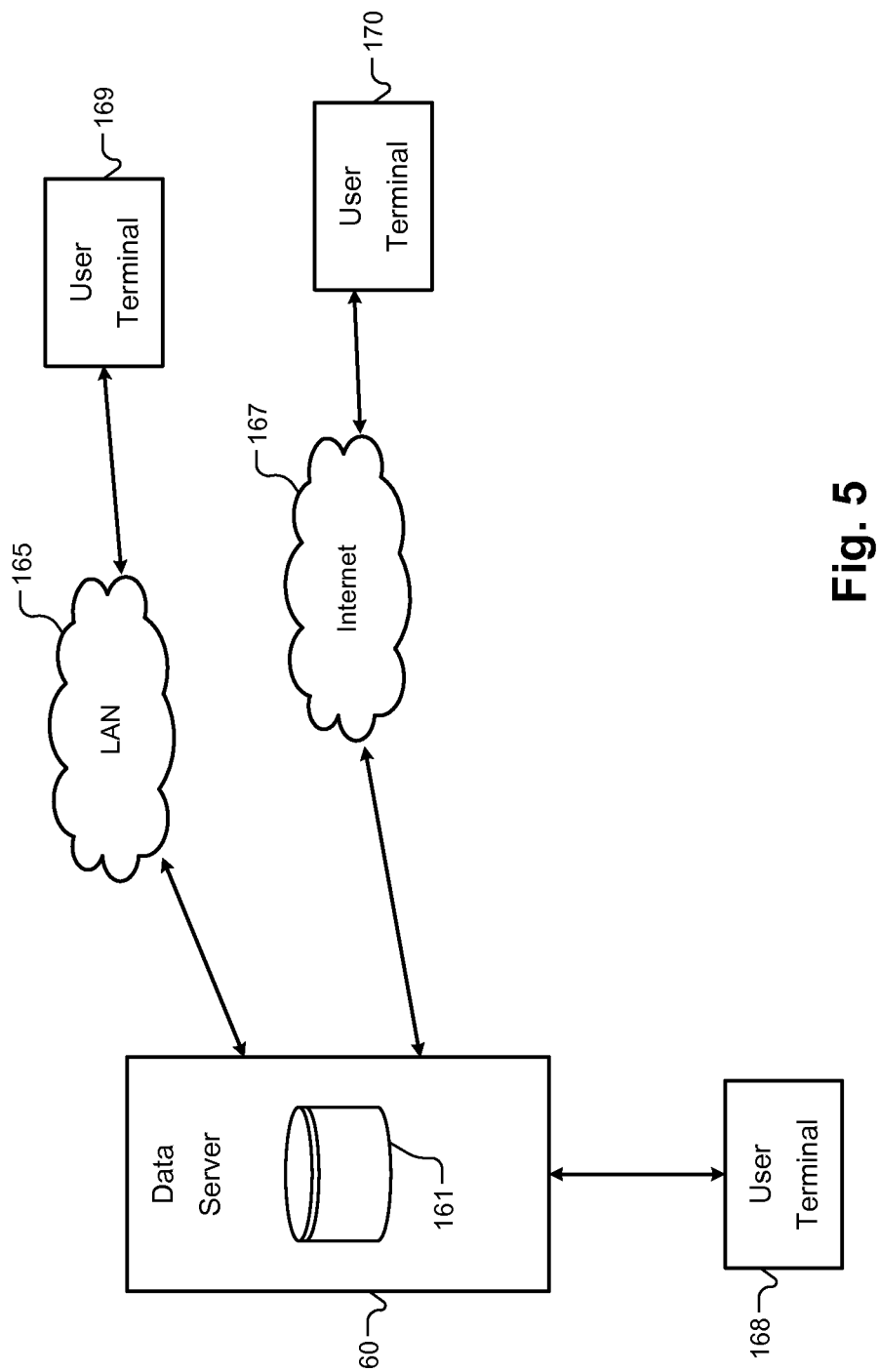
FIG. 5 is a block diagram of a data server and user terminals in accordance with the present disclosure.

With reference to FIG. 5, the data server 60 includes a computer-readable medium 161 that stores the data sets collected from the various building systems, controllers, and sensors. User terminals 168, 169, 170 can access the data sets stored at the data server 60. For example, a user terminal 168 can connect directly to the data server 160. Further, a user terminal 169 can connect to the data server 160 through a local area network (LAN) 165. Further, a user terminal 170 can connect to the data server 60 through the internet 167. The user terminals 168, 169, 170 include software to display the data sets as described above with respect to the screenshots shown at FIGS. 1, 2, and 3.

Figure 6:
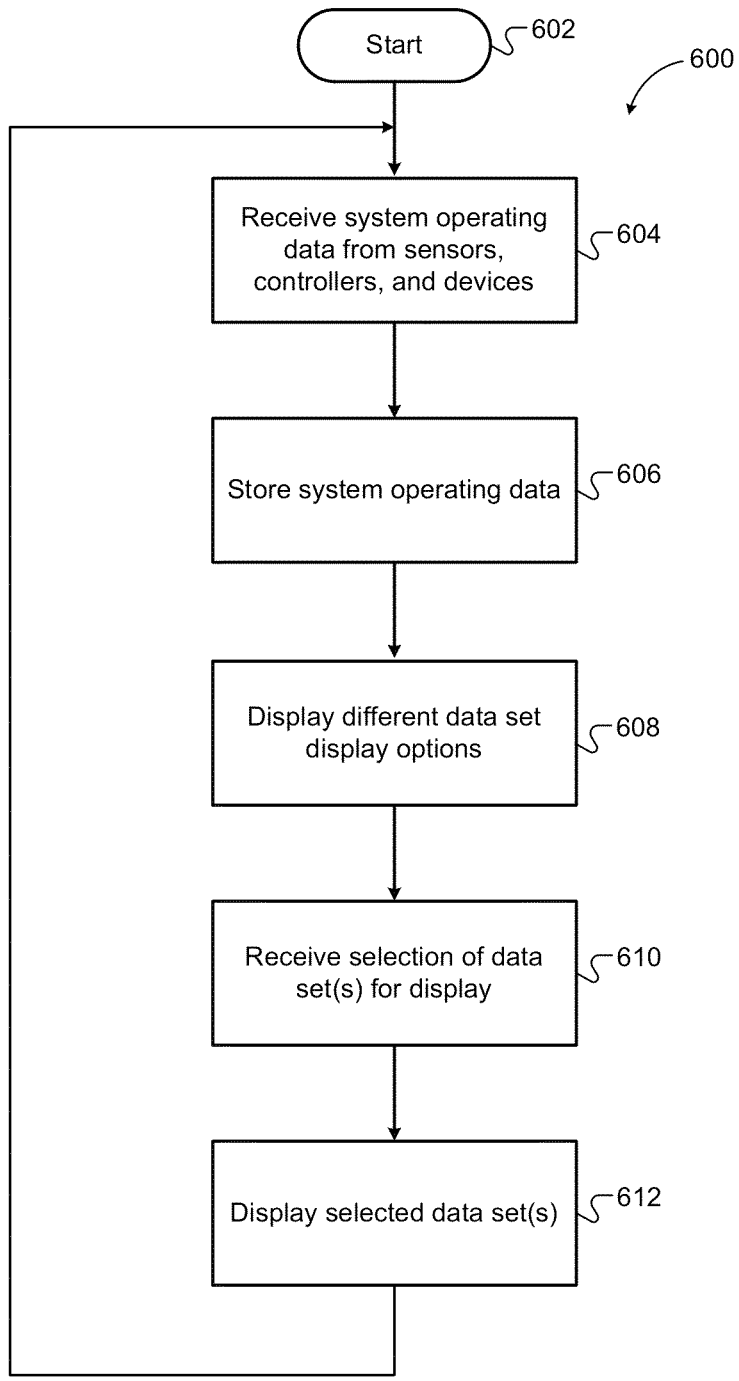
FIGS. 6 is a flow chart illustrating a method of the present disclosure.

With reference to FIG. 6, an algorithm 600 for displaying data in accordance with the present teachings is shown. The algorithm starts at 602. At step 604, the data server 60 receives system operating data from the various sensors, controllers, and devices. At step 606, the data server 60 stores the system operating data.

At step 608, the different data set display options are displayed by the user terminal 168, 169, 170. For example, the user terminal 168, 169, 170 can display the carousel selection window 22 shown in FIGS. 1 and 2. At step 610, a selection of one or more data sets for display is received by the user terminal 168, 169, 170. At step 612, the one or more selected data sets are displayed by the user terminal 168, 169, 170 in the main graph window 18 shown in FIGS. 1 and 2. After step 612, the algorithm loops back to step 604 and continues to receive system operating data from sensors, controllers, and devices.

As described herein, the systems and methods of the present disclosure allow users to compare time series data related to several dynamically interrelated devices, so that the interplay of conditions and performance among the devices (potential cause and effect) becomes apparent.

Data displayed in the data display window 10 as device clusters only represent readings from previously clustered devices. Although any point sensed by the system is potentially a member of a given cluster, the systems and methods of the present disclosure provide views and comparison only of data points in clusters defined for the system at a given time.

Further, the systems and methods of the present disclosure facilitate comparison of data for multiple devices at identical points in time from a potentially unlimited number of datasets. The carousel selection mechanism, as shown in FIGS. 1 and 2 in connection with the carousel selection window 22, supports any number of candidate devices or data sets. Further, multiple overlaid datasets can be displayed on a single large line graph, as shown in FIGS. 1 and 2 in connection with the main graph window 18. The main graph window 18 illustrates the values measured for each device, controller, sensor, etc. at the same point in time, permitting analysis and conclusions to be drawn by the user about corresponding effects and the apparent underlying operating environments. As the arrow carats at either end of the carousel selection window 22 are activated, the large thumbnail images 24 scroll off screen (one at a time), making room for additional thumbnails. If a data set is selected when the carats are activated, it remains selected even though it is off screen, as indicated by the highlighting of the small thumbnail images 26 beneath the large thumbnail images 24. The small thumbnail images 26 serve as tracking icons and represent the complete field of potential devices and data sets for display.

As discussed above, of the devices whose data sets are displayed in the main graph window 18, one can be designated as the current "focus". The interaction paradigm specifies that when a large thumbnail image 24 is selected once, its data appears on the main graph. When the same large thumbnail image 24 is selected a second time (without selection of any others), it becomes the current focus. The visual appearance of its trend line changes to indicate that status as the current focus and the log data window 20 is updated to show data values related to the data set that is designated as the current focus. In the table of the log data window 20, the point on the device's trend line that is highlighted currently is also highlighted in the corresponding row of the table. As focus is changed using the large thumbnail images 24, for example, the content of the log table in the log data window 20 also changes. Users may select the highlighting on a trend line and drag it along the line, causing the corresponding rows in the log table to highlight, one at a time. They also may scroll the log table entries, using a translucent scroll bar to the right in the log data window 20. The scroll bar is translucent to avoid obscuring data that may appear on the right end of some rows.

The carousel mechanism with carousel selection window 22 makes it possible to display datasets in the main graph from any device, controller, sensor, etc. for which there is log data available, regardless of where in the overall dataset those details reside. The small thumbnail images 26, or tracking icons, beneath the large thumbnail images 24 tell users where devices whose data are in the main graph currently reside within the full selection range.

As discussed above, for the time period currently selected by the time scale slider 28, the graph lines displayed in the large thumbnail images 24 are complete and accurate representations of the data fluctuations for that associated data set for the selected time period. In this way, users receive feedback from the large thumbnail images 24 about how data trends are varying, for every device in the carousel selection window 22. This information allows users to select appropriate datasets for display in the main graph window 18.

As discussed above, beneath the main graph window 18 is a time scale slider 28. This widget can be selected and dragged by users to change the time period within a selected log dataset that will be displayed in the various time lines. By gradually moving the slider in one direction or another, a user can see patterns of data as they change and are updated real-time, both within the large thumbnail images 24 and in comparison to corresponding changes in other devices and datasets whose time lines are shown in the display. This feature helps users to isolate the time periods during which anomalies of interest occur, when they stop and start, and how such events appear to affect the states of other (related) devices.

Several widgets in the data display window 10 increase the users' control over the utility of the display. First, plus and minus buttons 41 make it possible to zoom in or out in the main graph window 18, effectively changing the granularity of the time lines (more detail, less total time, or less detail, more total time). A pen button 42 allows users to save the current state of the display (main graph, log table, thumbnails) to a file, such as a spreadsheet export file, for later comparison or reporting. A screen enlarge/collapse icon 43 allows users to cause the main graph window 18 to take the entire usable screen, or once in that state, to collapse once again to its smaller, default size. The main buttons at top of the main graph, currently labeled "Today" and "Yesterday", allow users to reset the time periods addressed in the graph quickly. Granularity of these controls can be user selectable to customized time periods, for example, "Current Week" or "Current Month."

The systems and methods of the present disclosure also enable users to operate the display in "reverse" mode. For example, users can select the log table to be displayed in the log data window 20 and have that selection automatically drive which of the large thumbnail images 24 is selected as the current focus designation. Individual rows within the log table of the log data window 20 can be selected, determining which point in the time line for that dataset is highlighted in the main graph window 18. In this way, users can examine the changes in log table data and see the corresponding effects as a graphical pattern, in the display of the main graph window 18.

The data in the log data window 20 can also be pre-sorted, filtered, or grouped according to any of the columns in the dataset, thereby making it convenient to compare like entries in the main graph window 18. Event data, such as out-of-limit alarms can be overlaid on the log table of the log data window 20 and flagged or designated in the display of the main graph window 18 by activation of icons appearing at the bottom of the log table of the log data window 20.

In this way, data for several devices, sensors, controllers, equipment, etc., can be compared and examined and the implied interactions among such devices, sensors, controllers, etc., can be analyzed as part of a time series analysis. Any dataset that can be represented in a "time series" manner can be included in the system and methods of the present disclosure and displayed in the main graph window 18, the log data window 20, and in the large thumbnail images 24 of the carousel selection window 22.

In addition to line graphs, bar charts can be displayed with a somewhat different time scale, when the corresponding source data is ordinal rather than serial. In this way, the systems and methods of the present disclosure can be used with non-time series data as well.

The systems and methods of the present disclosure also include the ability to perform automated pattern recognition. For example, the systems and methods of the present disclosure can recognize anomalous data conditions and patterns (such as persistent out of limit values) and use this recognition to automatically display device clusters with relevant datasets selected and the anomalies displayed in the main graph. Whether data is out-of-limit is determined by preset ranges entered as a routine part of device setup and operation (e.g., set-points). In this way, a user can select an event, such as an alarm condition or fault, and the systems and methods of the present disclosure can recognize the relevant datasets that are related to the particular alarm or fault condition (i.e., temperature datasets, pressure datasets, defrost schedule datasets, etc.). In this way, the systems and methods of the present disclosure can automatically display the relevant datasets related to a particular alarm or fault condition.

As such, the systems and methods of the present disclosure provide a mechanism for comparison of many potentially interrelated sensor values, for many devices of concern to users. Despite the complexity of potential interactions and dataset views, the systems and methods of the present disclosure make it possible for users to evaluate dynamic effects among devices.

Additionally, the schematic display, shown in FIG. 3 serves as a direct entry point to content about all devices monitored by controllers, by device types, and also by individual devices, using menus within pop-ups. Additionally, the initial schematic for a facility can be generated automatically or delivered as part of the install package. The schematic can be bundled with a visual editor that allows users to reform the device clusters or create entirely new clusters, as needed. In this way, the schematic view provides the ability to represent graphically all equipment at a facility, grouped either via industry best practice and/or via user monitoring and data analysis needs.

Clusters of devices can be created in a number of ways. For example, predetermined, preprogrammed, or "canned" sets of device and dataset groups can be provided with the data server 60 to link datasets in ways that intuitively make engineering and functional sense. These clusters can be provided, for example, with the system at installation. For example, in a refrigeration system, preprogrammed clusters may include a suction pressure dataset, a condenser pressure dataset, a dataset for circuit or case defrost schedule times, and a circuit or case temperature dataset. In addition, the preprogrammed dataset group can include an event or alarm dataset, showing events or alarms related thereto. In addition, preprogrammed dataset groups can include subsets of a larger preprogrammed dataset group. Using the above example preprogrammed dataset group, other preprogrammed dataset groups can include the suction pressure dataset and the condenser pressure dataset. Additionally, other preprogramed dataset groups can include the dataset for circuit or case defrost schedule times and the circuit or case temperature dataset. The preprogrammed dataset groups can be prebuilt or determined based on the overall system setup. In this way, a user may be able to quickly diagnose common problems or issues with the refrigeration system, or the other building systems, such as the HVAC system, the lighting system, etc.

Additionally, clusters can be created by the system sensing interconnections at the end of system setup, and using configuration rules in an analytic engine delivered as part of the firmware of the data server 60. This provides a customized set of clusters for a specific facility, potentially disabling some canned clusters, if they are not meaningful in the installed context. In this way, the systems and methods of the present disclosure can sense the devices, controllers, sensors, and equipment at installation, and generate device clusters by analyzing the corresponding datasets available.

Additionally, device clusters can be generated, and also edited or revised, via a graphic configuration tool that permits users to associate any sensor points or datasets from anywhere within the facility. Users can customize or label the groups as clusters, and save them as part of the role profiles in a user management subsystem. From that point, the user created clusters are available both in the schematic display, shown in FIG. 3, and in the device clusters displays, shown in FIGS. 1 and 2.

The schematic view can use predefined clusters to facilitate user navigation to device-specific data. When selecting a type of subsystem (e.g., refrigeration cases), users can view a series of pop-up menus that first support selection of device type (e.g., dairy cases), then drill down to a specific device (e.g., Dairy Case 2). Standard device-specific displays can then show relevant sensor data as well as graphs of data patterns over time for the devices in question.

The schematic display view can inform users about the device types declared as part of the cluster and illustrate the logical relationships between defined clusters and the controller(s) and sensor(s) that monitor them. These relationships are created initially during cluster configuration.

In addition to using the pop-up menus, users can see basic data about each device type in a cluster by passing over the device type icon in the schematic view. A pop-up can appear, allowing users to decide whether conditions exist in those devices that warrant further exploration. If a member of a device set is in an alarm state, a small icon can appears on the device type icon which can be selected in order to show a pop-up that contains details of the alarm(s). The schematic view can be available at all times. An icon can be provided to toggle the view between the data display window 10 shown in FIGS. 1 and 2 and the schematic display window 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

For purposes of clarity, the same reference numbers are used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently), as appropriate, without altering the principles of the present disclosure.

As used herein, the term module may refer to, be part of, or include: an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first stage, element, component, region, layer or section discussed below could be termed a second stage, element, component, region, layer or section without departing from the teachings of the example embodiments.

What is claimed is:

1. A system comprising:
   a first building system including a first sensor that generates first operating data corresponding to the first building system, the first operating data including a plurality of first data values generated by the first sensor and corresponding time values associated with each of the first data values;
   a second building system including a second sensor that generates second operating data corresponding to the second building system, the second operating data including a plurality of second data values generated by the second sensor and corresponding time values associated with each of the second data values;
   a data server that receives and stores the first operating data and the second operating data over time;
   a user terminal that accesses the first operating data and the second operating data, that receives user input selecting the first operating data and the second operating data for display, that receives user input selecting a first time period for display, that displays the first data values from the first operating data that have corresponding time values within the first time period and the second data values from the second operating data that have corresponding time values within the first time period together in a graphical display having a common time axis such that the first data values from the first operating data are displayed in the graphical display aligned with the second data values from the second operating data having common corresponding time values, the common corresponding time values being indicated on the common time axis, that displays a thumbnail image corresponding to each set of operating data available for display in the graphical display, each thumbnail image including a graph displaying actual data values represented in the corresponding set of operating data that have corresponding time values within the first time period, that receives user input selecting a second time period for display, and that updates the graph for each thumbnail image to display the actual data values represented in the corresponding set of operating data that have corresponding time values within the second time period;

wherein each thumbnail image can be selected to display the corresponding set of operating data in the graphical display.

2. The system of claim 1, wherein at least one of the first building system and the second building system comprise at least one of: a refrigeration system, an HVAC system, a lighting system, and an alarm system.

3. The system of claim 1, wherein at least one of the first sensor and the second sensor comprise one of: a temperature sensor, a pressure sensor, and an electrical sensor.

4. The system of claim 1, wherein the user terminal displays a log table of data values corresponding to a selected one of the first and second operating data.

5. A non-transitory computer readable storage medium storing instructions executable by a processor for:
receiving a plurality of datasets, each dataset including operating data corresponding to at least one building system that is generated by at least one of a sensor and a controller of the corresponding building system, the operating data including a plurality of data values and corresponding time values and the computer readable storage medium including at least one preprogrammed selection option that includes a predetermined group of datasets from the plurality of datasets;
receiving a user input selection indicating a selected group of datasets for display in a graphical display, the selected group of datasets including at least one of the predetermined group of datasets of the preprogrammed selection option and a user-selected group of datasets from the plurality of datasets;
receiving user input selecting a first time period for display;
displaying the operating data for each of the selected group of datasets that has corresponding time values within the first time period in a graphical display having a common time axis such that data values from the operating data for each of the selected group of datasets are displayed in the graphical display aligned based on common corresponding time values, the common corresponding time values being indicated on the common time axis, including displaying the operating data for the predetermined group of datasets when the at least one preprogrammed selection option is selected;
displaying a thumbnail image corresponding to each dataset available for display in the graphical display, each thumbnail image including a graph displaying operating data from the corresponding dataset that has corresponding time values within the first time period;
receiving user input selecting a second time period for display; and
updating the graph for each thumbnail image to display operating data from the corresponding dataset that has corresponding time values within the second time period;
wherein each thumbnail image can be selected to display operating data from the corresponding dataset in the graphical display.

6. The non-transitory computer readable storage medium recited by claim 5, wherein the at least one building system includes a refrigeration system and the predetermined group of datasets includes at least one of: a suction pressure dataset; a condenser pressure dataset; a defrost schedule dataset; and a circuit temperature dataset.

7. The non-transitory computer readable storage medium recited by claim 5, wherein the at least one building system includes a refrigeration system and the predetermined group of datasets includes an alarm dataset that includes data corresponding to at least one of an alarm and a fault condition of the refrigeration system.

8. The non-transitory computer readable storage medium recited by claim 5, further comprising determining the predetermined group of datasets from the plurality of datasets for the preprogrammed selection option based on the received plurality of datasets.

9. A non-transitory computer readable storage medium storing instructions executable by a processor for:
receiving a plurality of datasets, each dataset including operating data corresponding to at least one building system that is generated by at least one of a sensor and a controller of the corresponding building system, the operating data including a plurality of data values and corresponding time values;
analyzing the plurality of datasets with the processor and determining at least one data pattern from the plurality of datasets;
determining a suggested dataset selection option based on the at least one data pattern from the plurality of datasets, the suggested dataset selection option including a preset group of datasets, each dataset of the preset group of datasets including data related to the determined at least one data pattern;
receiving a user input selection indicating a selected group of datasets for display in a graphical display, the selected group of datasets including at least one of the preset group of datasets of the suggested dataset selection option and a user-selected group of datasets from the plurality of datasets;
receiving user input selecting a first time period for display;
displaying the operating data for each of the selected group of datasets that has corresponding time values within the first time period in a graphical display having a common time axis such that data values from the operating data for each of the selected group of datasets are displayed in the graphical display aligned based on common corresponding time values, the common corresponding time values being indicated on the common time axis, including displaying the operating data for the preset group of datasets when the suggested dataset selection option is selected;

displaying a thumbnail image corresponding to each dataset available for display in the graphical display, each thumbnail image including a graph displaying operating data from the corresponding dataset that has corresponding time values within the first time period;

receiving user input selecting a second time period for display; and updating the graph for each thumbnail image to display operating data from the corresponding dataset that has corresponding time values within the second time period;

wherein each thumbnail image can be selected to display operating data from the corresponding dataset in the graphical display.

10. The non-transitory computer readable storage medium recited by claim 9, wherein the at least one building system includes a refrigeration system and the preset group of datasets includes at least one of: a suction pressure dataset; a condenser pressure dataset; a defrost schedule dataset; a circuit temperature dataset.

11. The non-transitory computer readable storage medium recited by claim 9, wherein the user input selection indicates selected thumbnail images corresponding to the selected group of datasets for display.

12. The non-transitory computer readable storage medium recited by claim 9, further comprising instructions executable by the processor for updating the graphical display to display data values falling within the second time period.

13. A non-transitory computer readable storage medium storing instructions executable by a processor for:

receiving a plurality of datasets, each dataset including operating data corresponding to at least one building system that is generated by at least one of a sensor and a controller of the corresponding building system, the operating data including a plurality of data values and corresponding time values;

receiving a user input selection indicating at least one of an event and a fault condition of the at least one building system;

determining a related dataset selection option based on at least one of the event and the fault condition, the related dataset selection option including a related group of datasets, each dataset of the related group of datasets including data related to at least one of the event and the fault condition;

receiving a user input selection indicating a selected group of datasets for display in a graphical display, the selected group of datasets including at least one of the related group of datasets of the related dataset selection option and a user-selected group of datasets from the plurality of datasets;

receiving user input selecting a first time period for display;

displaying the operating data for each of the selected group of datasets that has corresponding time values within the first time period in a graphical display having a common time axis such that data values from the operating data for each of the selected group of datasets are displayed in the graphical display aligned based on common corresponding time values, the common corresponding time values being indicated on the common time axis, including displaying the operating data for the related group of datasets when the related dataset selection option is selected;

displaying a thumbnail image corresponding to each dataset available for display in the graphical display, each thumbnail image including a graph displaying operating data from the corresponding dataset that has corresponding time values within the first time period;

receiving user input selecting a second time period for display; and updating the graph for each thumbnail image to display operating data from the corresponding dataset that has corresponding time values within the second time period;

wherein each thumbnail image can be selected to display operating data from the corresponding dataset in the graphical display.

14. The non-transitory computer readable storage medium recited by claim 13, wherein the at least one building system includes a refrigeration system and the related group of datasets includes at least one of: a suction pressure dataset; a condenser pressure dataset; a defrost schedule dataset; a circuit temperature dataset.

15. The non-transitory computer readable storage medium recited by claim 13, wherein the user input selection indicates selected thumbnail images corresponding to the selected group of datasets for display.

\* \* \* \* \*